(12) United States Patent
de Waal (10) Patent No.: US 7,590,815 B1
(45) Date of Patent: Sep. 15, 2009

(54) METHOD AND APPARATUS FOR PARTIAL MEMORY POWER SHUTOFF

(75) Inventor: Abraham B. de Waal, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 11/399,037

(22) Filed: Apr. 5, 2006

Related U.S. Application Data (63) Continuation of application No. 10/232,504, filed on Aug. 30, 2002.

(51) Int. Cl.
*G06F 12/16* (2006.01)
*G06F 1/26* (2006.01)

(52) U.S. Cl. ........................ 711/170; 713/320

(58) Field of Classification Search .................. None
See application file for complete search history.

(56) References Cited

U.S. PATENT DOCUMENTS

| | | | | |
|---|---|---|---|---|
| 4,744,076 | A | * | 5/1988 | Elias ........................ 326/101 |
| 5,471,189 | A | | 11/1995 | Dietz et al. |
| 5,493,670 | A | * | 2/1996 | Douglis et al. ............ 713/324 |
| 5,517,441 | A | | 5/1996 | Dietz et al. |
| 5,588,099 | A | | 12/1996 | Mogilevsky et al. |
| 5,649,222 | A | | 7/1997 | Mogilevsky |
| 5,659,687 | A | | 8/1997 | Kim et al. |
| 5,687,382 | A | * | 11/1997 | Kojima et al. ............ 713/320 |
| 6,011,546 | A | * | 1/2000 | Bertram ...................... 715/700 |
| 6,029,170 | A | | 2/2000 | Garger et al. |
| 6,040,845 | A | * | 3/2000 | Melo et al. .................. 345/520 |
| 6,061,679 | A | | 5/2000 | Bournas et al. |
| 6,169,984 | B1 | | 1/2001 | Bogdan |
| 6,191,969 | B1 | | 2/2001 | Pereira |
| 6,191,970 | B1 | | 2/2001 | Pereira |
| 6,212,645 | B1 | | 4/2001 | Tjandrasuwita |
| 6,243,280 | B1 | | 6/2001 | Wong et al. |
| 6,249,284 | B1 | | 6/2001 | Bogdan |
| 6,538,947 | B2 | | 3/2003 | Ahmed et al. |
| 6,584,003 | B1 | | 6/2003 | Kim et al. |
| 6,762,768 | B2 | | 7/2004 | Dilliplane |
| 6,768,659 | B2 | | 7/2004 | Gillingham et al. |

(Continued)

OTHER PUBLICATIONS

Henrich, "A Hybrid Split Strategy for k-d-Tree Based Access Structures," ACM Proceedings of the Fourth.ACM Workshop on Advances in Geographic Information Systems, pp. 1-8, 1997.

(Continued)

*Primary Examiner*—Hyung S Sough
*Assistant Examiner*—Duc T Doan (57) ABSTRACT

A method for managing host system power consumption is provided. The host system includes host memory and external memory. The method initiates with providing a processor in communication with a memory chip over a bus. The memory chip is external memory. Then, a usage measurement of the external memory is determined. If the usage measurement is below a threshold value, the method includes copying data from the memory chip to the host memory and terminating power to the memory chip. In one embodiment, the power is terminated to at least one bank of memory in the memory chip. In another embodiment, an amount of reduction of the external memory can be determined rather than a usage measurement. In yet another embodiment, an address map is reconfigured in order to maintain a contiguous configuration. A graphical user interface and a memory chip are provided also.

22 Claims, 6 Drawing Sheets

U.S. PATENT DOCUMENTS

| | | | |
|---|---|---|---|
| 6,877,098 B1* | 4/2005 | Lavelle et al. | 713/320 |
| 6,990,594 B2 | 1/2006 | Kim | |
| 7,043,649 B2 | 5/2006 | Terrell, II | |
| 7,256,232 B2 | 8/2007 | Lamaze et al. | |
| 2002/0172008 A1 | 11/2002 | Michael | |
| 2003/0023825 A1* | 1/2003 | Woo et al. | 711/170 |
| 2003/0204761 A1 | 10/2003 | D'Alessio | |
| 2003/0206164 A1* | 11/2003 | Juenger | 345/211 |
| 2003/0233525 A1 | 12/2003 | Reeves | |
| 2005/0015321 A1 | 1/2005 | Vindekilde | |

OTHER PUBLICATIONS

Khuller et al., "Graph and Network Algorithms," The Computer Science and Engineering Handbook, Tucker, Jr. (ed.), pp. 203-225, 1997.

Manohararajah, "Parallel Alpha-Beta Search on Shared Memory Multiprocessors," pp. 1-92, Apr. 24, 2002.

McEneaney, "Visualizing and Assessing Navigation in Hypertext," ACM Proceedings of the Tenth ACM Conference on Hypertext and Hypermedia:Returning to our Diverse Roots, pp. 61-70, 1999.

Samet, The Design and Analysis of Spatial Data Structures, Addison-Wesley, Reading, MA, pp. 240-257, 1990.

Tamassia, et al., "Data Structures," The Computer Science and Engineering Handbook, Tucker, Jr. (ed.), pp. 86-110, 1997.

Turbak, "Slivers: computational Modularity via Synchronized Lazy Aggregates," http://nike.wellesley.edu/~fturbak/pubs/phd/, pp. 1-2, Apr. 24, 2002.

Yao, "Tree Structures Construction Using key Densities," ACM Proceedings of the 1975 Annual Conference, pp. 337-342, 1975.

"Introduction to ViewLink," http://msdn.microsoft.com/workshop/author/behaviors/overview/viewlink_ovw.asp, pp. 1-9, Dec. 17, 2002.

"Microsoft Brandishes its Trident," http://news.com.com/2100-1001-239879.stml?tag=mainstry, pp. 1-2, Oct. 21, 1996.

"Splay tree," http://searchdatabase.techtarget.com/sDefinition/0,,sid13_gci511191,00.html, pp. 1-3, Feb. 12, 2002.

"TextRange Object: Members Table: Attributes/Properties," http://msdn.microsoft.com/workshop/author/dhtml/reference/objects/obj_textrange.asp, pp. 1-2, Dec. 17, 2002.

"TextRange Object: Members Table: Methods," http://msdn.microsoft.com/workshop/author/dhtml/reference/objects/obj_textrange.asp, pp. 1-3, Dec. 17, 2002.

"Viewlink Behaviors," http://msdn.microsoft.com/workshop/author/behaviors/overview/viewlink_ovw_entry.asp, pp. 1, Dec. 17, 2002.

"W3C, XForms 1.0, W3C Working Draft," http://www/w3.org/TR/2002/WD-xforms-20020118, pp. 1-97, Jan. 18, 2002.

"What is XUL?" Chapter 1, pp. 1-18, Jul. 10, 2001.

"XBL-XML Binding Language," http://www/w3.org/TR/xbl/, Hyatt (ed.), pp. 1-35, Feb. 23, 2001.

"XForms-The Next Generation of Web Forms," http://www.w3.org/MarkUp/Forms/, pp. 1-6, 2001.

"About Viewlink CSS Inheritance," http://msdn.microsoft.com/workshop/author/behaviors/overview/viewlink_ovw_css.asp, pp. 1-3, Dec. 17, 2002.

"About Viewlink Event Routing," http://msdn.microsoft.com/workshop/author/behaviors/overview/viewlink_ovw_events.asp, pp. 1-3, Dec. 17, 2002.

"Benefits of using ViewLink," http://msdn.microsoft.com/workshop/samples/author/behaviors/overview/vlcomparison.htm , p. 1, Dec. 17, 2002.

"CreateTextRange Method," http://msdn.microsoft.com/workshop/author/dhtml/reference/methods/createtextrange.asp, pp. 1-2, Dec. 17, 2002.

"Introduction to Markup Services," http://msdn.microsoft.com/workshop/browser/mshtml/overview/intromarkupsvc.asp, pp. 1-12, Feb. 12, 2002.

Zukowski, et al. "Use of Selective Precharge for Low Power on the Match Lines of Content-Addressable Memories", 0-8186-8099-7/97, 1997 IEEE.

\* cited by examiner

METHOD AND APPARATUS FOR PARTIAL MEMORY POWER SHUTOFF

This patent application is a Continuation of co-pending, commonly-owned patent application Ser. No. 10/232,504, filed on Aug. 30, 2002, entitled "METHOD AND APPARATUS FOR PARTIAL MEMORY POWER SHUTOFF", by Abraham B. de Waal, which is incorporated herein by reference.

BACKGROUND OF THE INVENTION

1. Field of the Invention

This invention relates generally to power management and more particularly to a method and apparatus to reduce the power consumption of portable devices to increase battery life by turning off power to at least a subset of memory associated with the portable devices.

2. Description of the Related Art

Portable electronic devices rely on batteries to provide the necessary power for the operation of the device. Consumers using the portable devices want to be able to use the devices for longer time periods in between having to recharge the batteries. As such, there is a continual effort to increase battery performance and to perform the operations in more energy efficient ways as the applications performed by the devices become more sophisticated and in some cases require more power. For example, some portable devices are configured to go into a sleep mode when they are inactive after certain time periods, such as laptop computers. Additionally, the clock speed can be driven down during these sleep modes to further reduce power consumption.

However, the power saving modes currently in use are active modes. That is, the power saving modes do not actually shut the component off. Instead, the power saving modes put the component into a sleep mode. Although the sleep modes may reduce the power used, the devices are still active in the sleep mode. Accordingly, the devices are still consuming power at a reduced consumption rate.

As a result, there is a need to solve the problems of the prior art to provide a method and apparatus for reducing the power consumption of battery operated computer electronic devices so that that battery life can be extended by terminating power to certain components.

SUMMARY OF THE INVENTION

Broadly speaking, the present invention fills these needs by providing a method and apparatus for extending the battery life through the management of power consumption. It should be appreciated that the present invention can be implemented in numerous ways, including as a process, a system, or a device. Several inventive embodiments of the present invention are described below.

In one aspect of the invention a method for managing host system power consumption is provided. The host system includes host memory and external memory. The method initiates with providing a processor in communication with a memory chip over a bus, wherein the memory chip is external memory. Then, a usage measurement of the external memory is determined. If the usage measurement is below a threshold value, the method includes copying data from the memory chip to the host memory and terminating power to the memory chip. In one embodiment, the power is terminated to at least one bank of memory in the memory chip. In another embodiment, an amount of reduction of the external memory can be determined rather than a usage measurement being determined. In yet another embodiment, an address map is reconfigured in order to maintain a contiguous configuration. In still yet another embodiment, the threshold value can be set by the operating system.

In another aspect of the invention, a method for managing host system power consumption is provided. The method initiates with providing a processor in communication with a first memory chip over a first bus and a second memory chip over a second bus, the first and second memory chips being external memory. Then, a usage measurement of the external memory is determined. If the usage measurement is below a threshold value the method includes copying data stored in the first memory chip to the second memory chip and terminating power to the first memory chip and the first bus. In one embodiment, the power is terminated to at least one bank of memory in the memory chip. In another embodiment, an amount of reduction of the external memory can be determined rather than a usage measurement being determined. In yet another embodiment, an address map is reconfigured in order to maintain a contiguous configuration. In still yet another embodiment, the threshold value can be set by the operating system.

In yet another aspect of the invention, a method for managing host system power consumption is provided. The host system includes host memory. The method initiates with providing a processor in communication with a graphics processing unit (GPU). The GPU includes memory external to the host system. The GPU memory includes at least one memory chip. Then, a usage measurement of the external memory is determined. If the usage measurement is below a threshold value, the method includes copying data from the at least one memory chip to the host memory; remapping resource pointers in the GPU memory to point to the host memory; and terminating power to the at least one memory chip. In one embodiment, the power is terminated to at least one bank of memory in the memory chip. In another embodiment, an amount of reduction of the external memory can be determined rather than a usage measurement being determined. In yet another embodiment, an address map is reconfigured in order to maintain a contiguous configuration. In still yet another embodiment, the threshold value can be set by the operating system.

In still yet another aspect of the invention, a method for powering down a portion of memory of a host system is provided. The host system includes an operating system and the memory includes at least one memory chip. The method initiates with requesting an amount of the memory, where the request causes the amount of the memory to become unused by the operating system. Then, a translational look aside buffer is remapped so that at least some of the requested amount of memory is located in the memory chip. Next, power to the memory chip is terminated.

In another aspect of the invention, a graphical user interface (GUI) rendered by a computer system is provided. The GUI includes a user interface for selecting a power mode of the computer system. The user interface includes computer code for triggering the selection of the power mode, wherein the user interface allows a user to choose between battery life and functionality. In one embodiment, the user interface allows a user to choose between battery life and amount of active semiconductor memory. In another embodiment, the user interface allows a user to choose between battery life and use of features in a graphics renderer.

In yet another aspect of the invention, a memory chip is provided. The memory chip includes a memory core and peripheral circuitry. The peripheral circuitry is configured to remain in an on state when power to the memory core is terminated to enable signal integrity for the memory chip when the memory chip is one of a plurality of memory chips on a bus. In one embodiment, passive signal integrity solutions, such as termination resistors are provided.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION OF THE PREFERRED EMBODIMENTS

An invention is described for an apparatus and method for reducing power consumption of a battery operated device. It will be obvious, however, to one skilled in the art, that the present invention may be practiced without some or all of these specific details. In other instances, well known process operations have not been described in detail in order not to unnecessarily obscure the present invention.

The embodiments of the present invention provide a method and apparatus that terminates power to a device or a subset of the components of a device to reduce power consumption without sacrificing performance. In one embodiment, power to a subset of memory is turned off. Prior to turning off the power, the data contained within the memory is copied into memory remaining powered. In one embodiment, the memory can be associated with a graphics processing unit (GPU) and the data within the memory to be turned off can be copied to a central processing unit (CPU) in communication with the GPU. Thus, resource tables containing resource pointers inside the GPU can be used to remap resources stored in graphics memory to CPU memory. In another embodiment, the memory core of a memory chip is turned off while part of the peripheral circuits of the memory remain powered to enable the shutdown of a subset of memory chips on a bus without impacting the performance of the remaining powered memory chips on the bus.

Figure 1A:
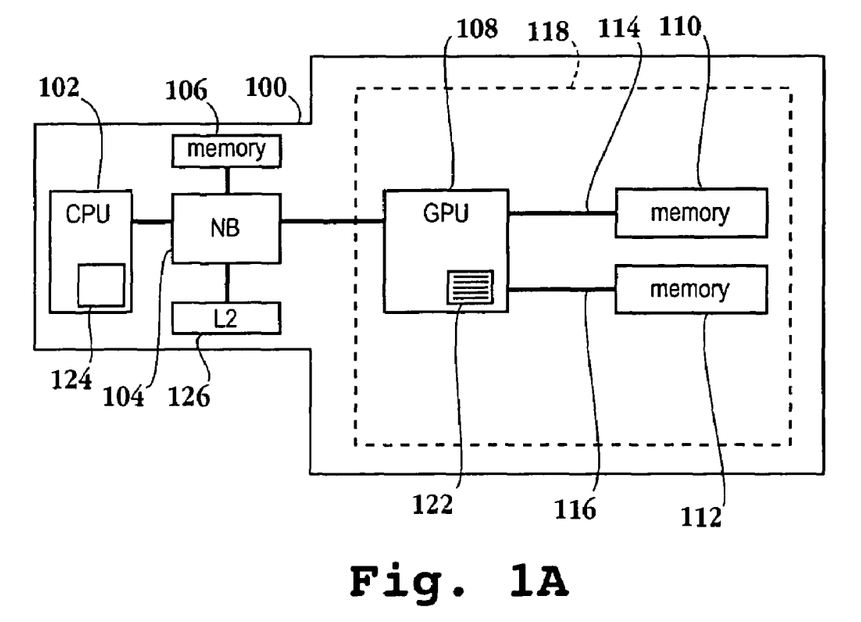
FIG. 1A is a high level schematic diagram of the memory associated with a graphics controller of a battery powered device where the memory can be powered off in accordance with one embodiment of the invention.

FIG. 1A is a high level schematic diagram of the memory associated with a graphics controller of a battery powered device where the memory can be powered off in accordance with one embodiment of the invention. Portable device 100 includes central processing unit (CPU) 102 in communication with Northbridge chipset 104. Northbridge chipset 104 is in communication with memory 106 and with graphics processing unit (GPU) 108. As is well known, Northbridge chipset 104 controls interaction with memory 106, the peripheral component interconnect (PCI) bus, level 2 cache, and all accelerated graphics port (AGP) activities. Therefore, Northbridge chipset 104 couples to graphics card 118 by way of an AGP bus. Graphics card 118 includes graphics processing unit 108 in communication with memory chip 110 over bus 114. GPU 108 is also in communication with memory chip 112 over bus 116.

Still referring to FIG. 1A, external memory chips 110 and 112 can be powered off in one embodiment of the invention. For example, in response to detecting memory 110 not being used, the power being supplied to memory chip 110 can be turned off. More particularly, where each memory chip is a 32 megabyte (MB) memory chip, the system can detect that 32 MB or less of the memory is being used, therefore, power to one of the memory chips can be turned off. In essence, a switch is placed prior to either of memory chips 110 or 112 which terminates the power. It should be appreciated that the power to memory chip 110 is powered off completely and the memory chip does not go into a sleep mode in this embodiment. Of course, prior to turning off the power, any data within memory chip 110 is copied to memory 106. That is, the data is backed-up into main memory 106 of device 100. Since the graphics memory is considered volatile, the operating system (OS) is configured to not rely on any memory being present after a resolution change of a screen. Thus, if the memory chip is powered down at that time, i.e., after the resolution change, then it is not necessary to back-up the data to the main memory in one embodiment.

Figure 1B:
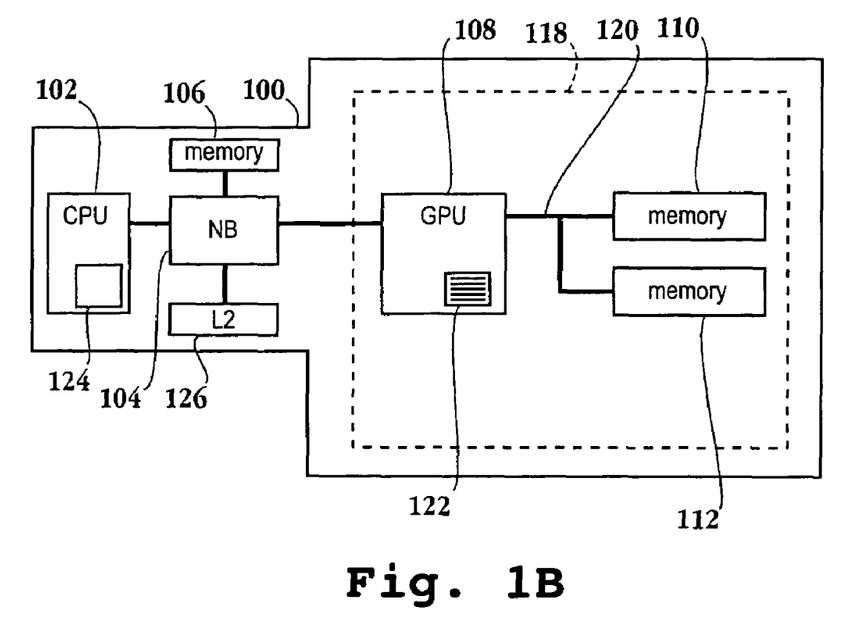
FIG. 1B is an alternative embodiment of FIG. 1A where the external memory chips are located on a common bus.

FIG. 1B is an alternative embodiment of FIG. 1A where the external memory chips are located on a common bus. Memory chips 110 and 112 of graphics card 118 share bus 120. In this embodiment, since the memory chips share bus 120, the peripheral circuits of a memory chip to be powered off remain on for signal integrity purposes, while power to the memory core is terminated, as will be described further with reference to FIG. 3. In one embodiment, the refresh function associated with dynamic random access memory (DRAM), which is a large consumer of power, is turned off while the peripheral circuits remain powered. It should be appreciated that while two memory chips are illustrated in FIG. 1B, any suitable number of memory chips can share bus 120.

Referring the FIGS. 1A and 1B, the copying of the data from memory chips 110 and 112 to the system memory 106 requires that resources in GPU 108 be updated accordingly. In turn, pointers to the data must be changed so that the operating system is informed as to where the data resides. For example, resource pointer 122 identifies the location of the data and is updated to reflect the transfer of the data to memory 106 from memory chip 110 or memory chip 112. As is generally known, the operating system looks to the graphics engine, i.e., GPU, to determine where data is located. Therefore, by updating the appropriate resource pointer 122, the operating system can locate the data which is copied into memory 106. It will be apparent to one skilled in the art that the resources stored in graphics memory include draw surfaces, textures, cached fonts, video overlays, etc. Alternatively, an algorithm that does not require the use of resource pointer 122 can be used here. Thus, the operating system or a driver will manage the movement of resources.

It should be appreciated that the present invention can be expanded for use with the cache memory, such as the L1 or L2 cache memory, associated with CPU 124. For example, L1 cache memory 124 associated with CPU 102 can be powered down if it is not necessary for an application being executed by the CPU. Similarly, L2 cache memory 126 can be powered down based on the application being executed by CPU 102. In one embodiment, parts of the L1 or L2 cache are powered down rather than all of the L1 or L2 cache. As discusses in more detail with reference to FIG. 5, a graphical user interface (GUI) is configured to enable a user the ability to define the power management level, i.e., power mode. That is, the user can determine an operating mode where certain functionality is turned off and not just put to sleep.

Figure 2:
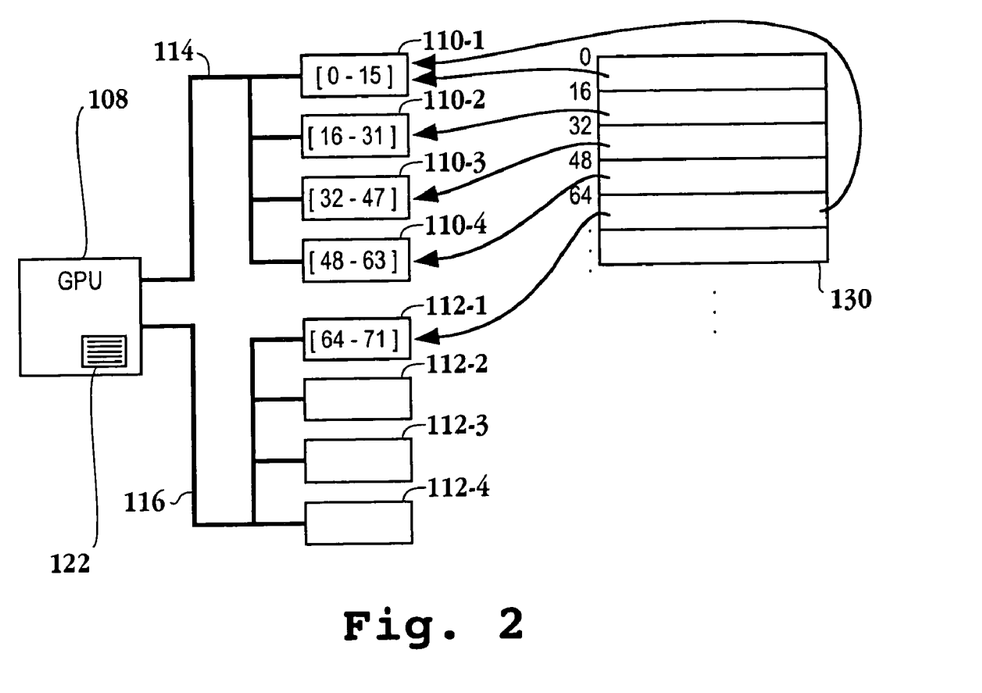
FIG. 2 is a schematic diagram illustrating the reconfiguration of the address map associated with multiple memory chips to keep the memory contiguous when power to one or more memory chips is turned off in accordance with one embodiment of the invention.

FIG. 2 is a schematic diagram illustrating the reconfiguration of the address map associated with multiple memory chips to keep the memory contiguous when power to one or more memory chips is turned off in accordance with one embodiment of the invention. GPU 108 is in communication with bus 114 and bus 116. Memory chips 110-1 through 110-4 are associated with bus 114, memory chips 112-1 through 112-4 are associated with bus 116. Address map 130 is configured to indicate that the first 16 bytes are mapped to memory chip 110-1, the second 16 bytes are mapped to memory chip 110-2, the third 16 bytes are mapped to memory chip 110-3, and so on for the remainder of memory chips associated with GPU 108.

Still referring to FIG. 2, as bandwidth is important in graphics processors, multiple buses are used to increase memory bandwidth. However, due to the multiple buses, the addresses are interleaved between the separate memories. For example, turning off one of two memory chips results in every other address being invalid, i.e., not contiguous. Accordingly, where the power for memory chips 112-1 through 112-4 of FIG. 2 is turned off, not only does the data from memory chips 112-1 through 112-4 have to be copied so as not to be lost, but the geometry of address map 130 must be reconfigured so that the memory is contiguous. Therefore, address map 130 must be reconfigured such that the fifth 16 bytes, which were previously mapped to memory chip 112-1, are remapped to point to memory 110-1 if the contents of memory chip 112-1 are copied into memory chip 110-1. It should be appreciated that where the power is turned off to memory chips 112-1 through 112-4, the data from memory chips 112-1 through 112-4 can be copied to memory chips 110-1 through 110-4, respectively. Alternatively, the data can be copied to the main memory of a CPU in communication with GPU 108 as discussed with reference to FIG. 1A or 1B. In yet another embodiment, a portion of the data can be copied to main memory and the remaining portion of the data can be copied into memory chips 110-1 through 110-4. Additionally, some of the data from memory chips 110-1 through 110-4 may be copied into main memory even though these chips remain active. Accordingly, the geometry of address map 130 must be reconfigured to represent the configuration resulting from turning off the power of to a memory chip or a set of memory chips. It should be appreciated that address map 130 is not limited to a programmable table. In one embodiment, address map 130 can be an algorithmic function. For example, odd multiples of 8 are mapped onto bus 114 and even multiples of 8 are mapped onto bus 116. Thus, the reorganization of the data involves moving the data so that the new algorithm produces a contiguous memory when one bus is turned off.

Figure 3:
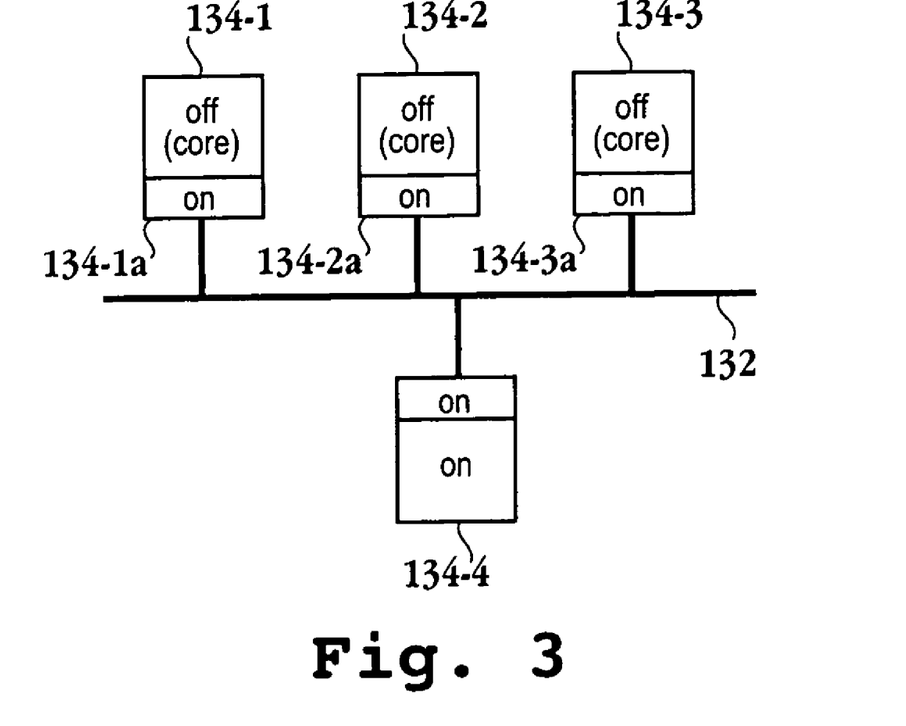
FIG. 3 is a simplified schematic diagram of multiple memory chips sharing a common bus where some of the memory chips are configured to leave part of the peripheral circuits on while turning off power to the memory core in accordance with one embodiment of the invention.

FIG. 3 is a simplified schematic diagram of multiple memory chips sharing a common bus where some of the memory chips are configured to leave part of the peripheral circuits on while turning off power to the memory core in accordance with one embodiment of the invention. Here, memory chips 134-1 through 134-3 have peripheral circuitry 134-1a through 134-3a, respectively, that remains powered. However, the power to the memory core for each of the corresponding memory chips is terminated. Memory 134-4 is fully powered. Thus, where power is terminated to a subset of the memory chips on a shared bus the signal integrity is not affected, since the peripheral circuitry remains powered. That is, the electrical properties of the bus remain unaffected as power to the cores of memories 134-1 through 134-3 is shut off. Thus, impedance matching is not a concern in this configuration. In one embodiment, passive signal integrity solutions, such as termination resistors, are included in the peripheral circuitry to enable the electrical properties of the bus to remain unaffected as power to the cores of memories 134-1 through 134-3 is shut off. While FIG. 3 illustrates 4 memory chips on a shared bus where power is terminated to three of the memory chips, any suitable number memory chips can be on a shared bus. Additionally, the power can be terminated to any subset of the memory chips on the shared bus. It should be appreciated that where separate buses are used and power to an entire bank of memory chips on a bus is terminated, the signal integrity and impedance matching are not concerns as the power is terminated to the entire bus.

Figure 4:
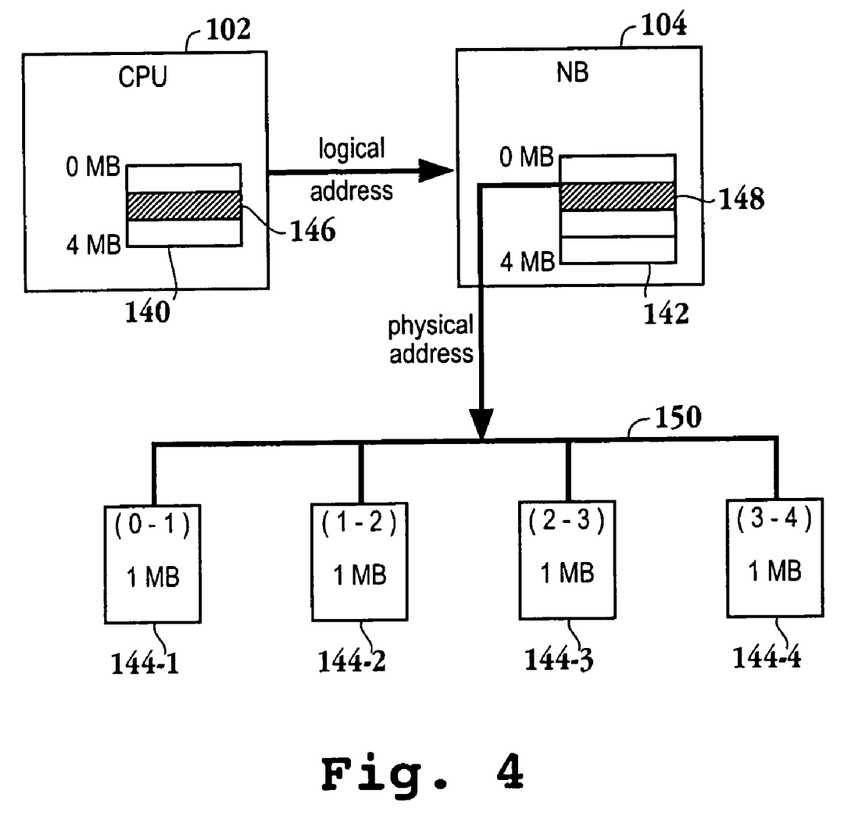
FIG. 4 is a simplified schematic diagram of an implementation for dedicating a portion of memory associated with a central processing unit so that power for a memory chip associated with the CPU can be terminated in accordance with one embodiment of the invention.

FIG. 4 is a simplified schematic diagram of an implementation for dedicating a portion of memory associated with a central processing unit so that power for a memory chip associated with the CPU can be terminated in accordance with one embodiment of the invention. CPU 102 is in communication with Northbridge 104. Northbridge 104 is in communication with 4 memory devices 144-1 through 144-4 over bus 150. In one embodiment, each of memory devices 144-1 through 144-4 has a storage capacity of 1 megabyte (MB). Thus, the combined capacity is 4 MB. Within Northbridge 104 is translational look aside buffer (TLB) 142. It will be apparent to one skilled in the art that TLB 142 includes an address map to translate the logical address supplied by the CPU to the physical address for the data in the memory devices. In one embodiment, a swizzling pattern can be employed in TLB 142 where the logical addresses for the data are scattered over memory devices 144-1 through 144-4. CPU 102 includes logical address space 140 for 0 MB-4 MB. In another embodiment, where it is desired to power down a portion of memory of the host system, such as memory device 144-2, a request to the operating system (OS) for 1 MB of memory space is made. It should be appreciated that the size of 1 MB is sufficient to store data from memory device 144-2. The request results in 1 MB of address space being reserved in logical address space 140. Then, the logical addresses for reserved region 146 in logical address space 140, become the physical addresses for the 1-2 MB range 148 of TLB 142, wherein the 1-2 MB range 148 corresponds to memory device 144-2. As a result, the operating system actually has 4 MB of memory, however, by reserving the 1 MB of memory space the OS operates as if the OS has less than that amount.

It should be appreciated that reserved region 146 does not have to be contiguous. Of course, prior to terminating the power to memory device 144-2, the data inside memory device 144-2 is copied to one or more of the other memory devices 144-1, 144-3 and 144-4. Then, the 1-2 MB range 148 corresponding to memory device 144-2 is reserved in the CPU memory so that the CPU and the OS will proceed without using any memory within the range of the memory device to which power is terminated. In one embodiment, since each of the memory devices 144-1 through 144-4 share a common bus, the peripheral circuitry of chip 144-2 is left powered as discussed with reference to FIG. 3. As mentioned above, a passive integrity solution, such as termination resistors can be used in this embodiment. While FIG. 4 illustrates a single memory chip being powered down it should be appreciated that multiple memory chips can be shutdown. Alternatively, a partial memory shutdown of a memory chip, such as a dynamic random access memory (DRAM) chip, can be accomplished where there are multiple banks of memory in the chip. Here, power to one or more of the multiple banks of the memory chip can be terminated.

Still referring to FIG. 4, it should be appreciated that memory devices 144-1 through 144-4 are reconfigured to reserve a complete memory chip to be shut down. In one embodiment, after logical reserve region 146 has been allocated, TLB 142 is run through, or searched, to find entries that map to active chips, i.e., 144-1, 144-3 and 144-4, since the operating system provided a fragmented memory region. For each of the entries that map to the active chips, another TLB 142 entry that is outside of reserve region 146 and that points to the inactive chip, i.e., chip 144-2 is found. Then, the values are swapped and the data moved such that logical region 146 now has one additional page that points to the inactive chip, i.e., chip 144-2. Once all of the relevant sections of TLB 142 has been worked through as described above, chip 144-2 can be powered off.

Figure 5:
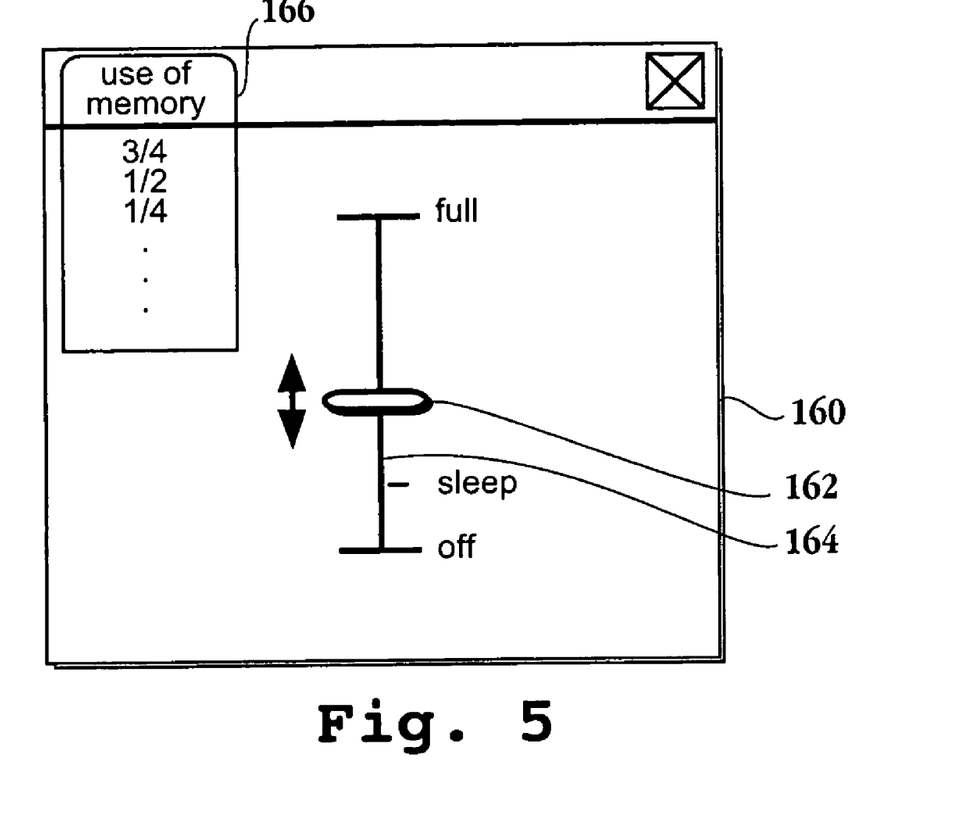
FIG. 5 is a schematic diagram of a representative graphical user interface (GUI) presented to a user to allow the user to allow a user a choice between power modes in accordance with one embodiment of the invention.

FIG. 5 is a schematic diagram of a representative graphical user interface (GUI) presented to a user to allow the user to allow a user a choice between power modes in accordance with one embodiment of the invention. GUI 160 includes a sliding knob 162 that can be placed at different positions along a continuum represented by line 164. At one end of the continuum, full power is offered. At the other end, an off mode is offered. Also shown is a sleep mode. Additionally, the user can select a mode that uses a percentage of memory from drop down menu 166. In one embodiment, the user can choose between more battery life or more functionality, between battery life and amount of active semiconductor memory, and/or between more battery life and use of features in a graphics renderer. The types of functionality can be further dissected. For example, the user can choose between game playing on an airplane and game playing at home. It should be appreciated that any suitable configuration for GUI 160 can be used that allows for management of the power modes.

Figure 6:
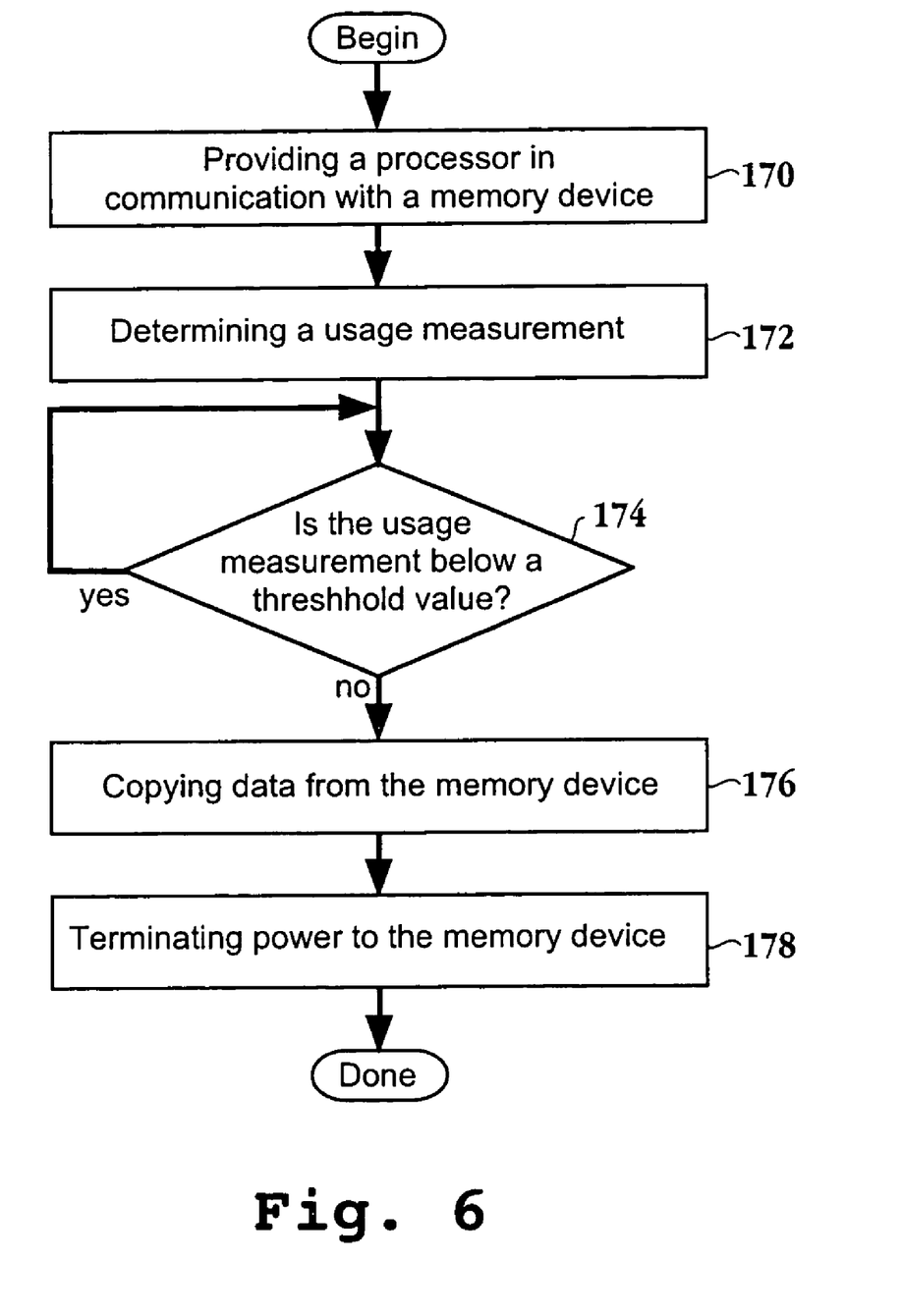
FIG. 6 is a flowchart diagram of the method operations for managing the power consumption of an electronic device in accordance with one embodiment of the invention.

FIG. 6 is a flowchart diagram of the method operations for managing the power consumption of an electronic device in accordance with one embodiment of the invention. The method initiates with operation 170 where a processor in communication with a memory device is provided. The processor can be a CPU or a GPU as mentioned above with reference to FIGS. 1A, 1B, 2 and 4. In one embodiment, the memory device is a memory chip external from host system memory. The method then advances to operation 172 where a usage measurement of the memory device, i.e., the external memory, is determined. Here, the usage measurement can take the form of monitoring the amount of memory capacity that is being used by one or more applications and/or an operating system. The method then moves to decision operation 174 where it is determined if the usage measurement is below a threshold value. It should be appreciated that the threshold value can be in terms of a percentage of memory usage or an absolute number. In one embodiment, the threshold value is selected or input through a graphical user interface, such as the graphical user interface of FIG. 5. It will be apparent to one skilled in the art that the threshold value can be set by the operating system forcing the system to meet the threshold value.

If the usage measurement is below a threshold value, then the method proceeds to operation 176 where data from the memory device, i.e., memory chip or memory bank within a memory chip, is copied to a location that will remain powered. The data can be copied to host memory or another memory chip. For example, where the external memory includes 2 32-MB memory chips and the threshold value is 32 MB, if the usage measurement is below 32 MB, then the data from one of the memory chips is copied to another location. As mentioned above, the data can be copied to another memory chip or host memory. The method then advances to operation 178 where power to the memory device is terminated. In one embodiment, the memory device does not remain in an active state, such as being put to sleep, as the power is terminated here. It should be appreciated that power to a bank of memory in a memory chip can be terminated here. If the usage measurement is not below a threshold value in operation 174, then the method will recheck the usage measurement and proceed as described above. It should be appreciated that a time delay can be built into rechecking the usage measurement. One skilled in the art will appreciate that some operating systems can force the system to meet the threshold value. Accordingly, the usage measurement can be set in this embodiment, rather than being determined as described above.

In summary, the embodiments described above allow for reducing the consumption of power by portable electronic devices. In turn, the battery life is extended. In one embodiment, the power to unnecessary memory devices is terminated to reduce the power consumption. The address configuration is remapped in order to allow for the termination of power to a memory device without interruption to the system operation. The embodiments described above are also relevant to a bank of memory within a memory chip. With respect to a bank of memory, power is terminated to at least one bank of memory after the address configuration is remapped.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data which can be thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims. It should be appreciated that the claims do not imply any particular order of steps or operations, unless explicitly stated that an ordering exists.

What is claimed is:

1. A method for powering down a portion of memory of a computer system, said method comprising:
    terminating access of an operating system of said computer system to said portion of memory based upon a memory usage measurement, said memory usage measurement is a memory capacity used by said operating system;
    in response to said memory usage measurement, remapping a translation look aside buffer to redirect accesses to said portion of memory; and
    terminating power to said portion of memory.

2. The method of claim 1, wherein said translation look aside buffer is associated with a Northbridge chipset.

3. The memory of claim 1, wherein the memory comprises dynamic random access memory (DRAM).

4. The memory of claim 1, wherein said portion of memory comprises a portion of a frame buffer.

5. A method for powering down a bank of memory of a computer system, said method comprising:
    terminating access of an operating system to said bank of memory based upon a memory usage measurement, said memory usage measurement is a memory capacity used by said operating system;
    in response to said memory usage measurement, remapping a translation look aside buffer to redirect accesses to said bank of memory; and
    terminating power to said bank of memory.

6. The method of claim 5, further comprising:
    copying data from said bank of memory to a memory device that remains powered.

7. The memory of claim 5, wherein the bank of memory comprises dynamic random access memory (DRAM).

8. The method of claim 5, wherein said bank of memory comprises a frame buffer.

9. A method of powering down a memory for reduced power consumption, said method comprising:
    measuring a memory usage, said memory usage is a memory capacity used by an operating system;
    in response to said measured memory usage, remapping a plurality of memory addresses pointing to a plurality of locations in said memory; and
    terminating a power source coupled to said memory.

10. The method of claim 9, wherein said plurality of memory addresses reside in a translation look aside buffer.

11. The method of claim 9, wherein said power source is coupled to a first portion of said memory, and wherein a second portion of said memory is configured to reduce degradation of a signal to another coupled memory.

12. The method of claim 11, wherein said degradation is caused by a reduction of power to said first portion.

13. The method of claim 9, wherein said plurality of memory addresses are remapped to a plurality of locations in another memory.

14. The method of claim 13, wherein said another memory comprises a frame buffer.

15. The method of claim 9, wherein said plurality of memory addresses are remapped to a plurality of locations in system memory.

16. The method of claim 9 further comprising:
    copying data stored in said memory before terminating said power source; and
    writing said data to another memory.

17. A user interface comprising:
    a display element comprising a first selectable power mode of a plurality of selectable power modes, said first selectable power mode corresponding to a memory usage threshold, said memory usage threshold is a memory capacity used by an operating system, said first selectable power mode is used to remap memory addresses pointing to locations in a memory in response to a comparison of said first memory usage threshold with a measured memory usage of said operating system, said first selectable power mode is further used to terminate a power source coupled to said memory.

18. The user interface of claim 17, wherein said display element is a drop down menu.

19. The user interface of claim 17, wherein said power source is coupled to a first portion of said memory, and wherein a second portion of said memory is configured to reduce degradation of a signal to another memory coupled to said memory.

20. The user interface of claim 17, wherein said memory comprises a frame buffer.

21. The user interface of claim 17, wherein said display element enables a user to choose between battery life and functionality.

22. The user interface of claim 17, wherein said display element enables a user to choose between battery life and an amount of active semiconductor memory.

* * * * *